United States Patent [19]

Rigler et al.

[11] Patent Number: 4,497,911
[45] Date of Patent: Feb. 5, 1985

[54] PRODUCTION OF FINE PARTICULATE, EXPANDABLE STYRENE POLYMERS WITH IMPROVED PROPERTIES

[75] Inventors: Josef K. Rigler, Recklinghausen; Karl Trukenbrod; Franz-Michael Bollenrath, both of Marl, all of Fed. Rep. of Germany

[73] Assignee: Chemische Werke Hüls AG, Marl, Fed. Rep. of Germany

[21] Appl. No.: 396,245

[22] Filed: Jul. 8, 1982

[30] Foreign Application Priority Data

Jul. 30, 1981 [DE] Fed. Rep. of Germany ....... 3130014
Jan. 3, 1982 [DE] Fed. Rep. of Germany ....... 3202159

[51] Int. Cl.³ ........................ C08F 12/08; C08F 2/18; C08F 2/44; C08J 9/20
[52] U.S. Cl. ........................ 521/56; 521/60; 521/146; 521/907
[58] Field of Search .................... 521/56, 60, 146, 907

[56] References Cited

U.S. PATENT DOCUMENTS

| | | | |
|---|---|---|---|
| 3,060,138 | 10/1962 | Wright | 260/2.5 |
| 3,265,643 | 8/1966 | Hatano | 260/2.5 |
| 3,320,188 | 5/1967 | Dijkema | 260/2.5 |
| 3,389,097 | 6/1968 | Ingram | 260/2.5 |
| 3,657,162 | 4/1972 | Finestone | 260/2.5 |
| 3,682,844 | 8/1972 | Schwoegler | 260/2.5 |
| 3,696,060 | 10/1972 | Burt | 260/2.5 |
| 3,755,209 | 8/1973 | Nintz | 260/2.5 |
| 4,029,614 | 6/1977 | Nintz | 260/2.5 |
| 4,086,191 | 4/1978 | Hinselmann | 260/2.5 |
| 4,192,922 | 3/1980 | Mixich | 521/56 |
| 4,228,244 | 10/1980 | Rigler | 521/56 |
| 4,281,036 | 7/1981 | Leithäuser | 427/222 |

Primary Examiner—Morton Foelak
Assistant Examiner—Nathan M. Nutter
Attorney, Agent, or Firm—Wells & Wells

[57] ABSTRACT

Process for the production of fine particulate, expandable styrene polymers by suspension-polymerizing styrene or possibly mixtures of styrene and other monomers having at least 50% by weight of styrene in the presence of expanding agents having low boiling points in incompletely filled reactors. The polymer beads to be charged with expanding agents are vigorously stirred during the addition of the expanding agent(s) in such a manner that these beads undergo the least possible contact in time and space with the gas phase and with each other, and so that the surface of the stirred medium retains a topology as free as possible from a funnel shape during stirring.

11 Claims, 12 Drawing Figures

PRODUCTION OF FINE PARTICULATE, EXPANDABLE STYRENE POLYMERS WITH IMPROVED PROPERTIES

CROSS-REFERENCES TO RELATED APPLICATIONS

Applicants claim priority under 35 USC 119 for applications No. P 31 30 014.6, filed July 30, 1981 and No. P 32 02 159.3, filed Jan. 3, 1982, in the Patent Office of the Federal Republic of Germany.

The disclosure of assignee's copending application Ser. No. 206,282, filed Nov. 12, 1980 now U.S. Pat. No. 4,337,319, is incorporated herein to further show the state of the art of self-extinguishing fine particulate expandable styrene polymers.

BACKGROUND OF THE INVENTION

The field of the invention is fire retardant, fine particulate, expandable styrene polymers for the preparation of molded articles. The present invention is particularly concerned with the production of expandable, particulate molding compositions of styrene polymers.

The state of the art of expandable polystyrene may be ascertained by reference to the Kirk-Othmer, "Encyclopedia of Chemical Technology," 2nd Edition, Vol. 9 (1966) under the section entitled "Foamed Plastics," pages 847–884, particularly pages 852, 853 and 855 where polystyrene is disclosed, and Vol. 19 (1969) under the section entitled "Styrene Plastics," pages 85–134, particularly pages 116–120, where polystyrene foams are disclosed and pages 120, 121 where prior art self-extenguishing polystyrene foams are disclosed and British Pat. Nos. 877,864 and 1,024,195 and U.S. Pat. Nos. 3,060,138; 3,265,643; 3,320,188; 3,389,097; 3,657,162; 3,682,844; 3,696,060; 3,755,209; 4,029,614; 4,086,191; 4,192,922; 4,228,244 and 4,281,036, the disclosures of which are incorporated herein.

The preparation of fine particulate, expandable styrene polymers takes place by a suspension polymerization process. Styrene and possibly styrene plus comonomers containing in dissolved form one or more water insoluble initiators are stirred and dispersed into approximately the same quantity of water. The amount and the kind of polymerization initiators are selected with respect to the temperature of polymerization so that on the one hand a complete polymerizing conversion is achieved in the shortest possible time, and on the other hand a polymer with a molecular weight between 200,000 and 300,000 is obtained. Slight amounts of an organic or inorganic dispersing agent, for instance a water-insoluble protective colloid such as polyvinylalcohol, hydroxyethyl cellulose, or a water-insoluble salt, such as tricalcium phosphate are used to improve the dispersion of the styrene phase in water or to adjust the particle size. In the case of particle size adjustment, slight amounts of an emulsifier are used to stabilize the suspension. Depending on the process, the expanding agent is added before, during or after the polymerization. In particular, the main amount of the expanding agent is added after formation of the grain spectrum, namely after a conversion of 50, in particular at least 70%, as disclosed in British Pat. Nos. 877,864 and 1,024,195; U.S. Pat. Nos. 3,696,060 and 3,657,162 and West German Published Application No. 19 16 387.

After completion of the polymerization cycle, the polymer is separated from the aqueous phase, washed and dried and sifted. Prior to further processing, the crude beads typically are provided with a surface coating for the purpose of preventing bonding during prefoaming.

Molded articles are made by expanding the fine, particulate, expandable styrene polymers in molds. In this procedure the fine, particulate styrene polymers first are heated by steam or hot gases to temperatures above their softening point, whereby they foam into a loose heap and this step is called prefoaming. The prefoamed styrene polymers first are stored for some interim time (ageing step) and then are made to foam further within a pressure-resistant but not gas-tight mold by further heating with steam, whereby they sinter into a molded body corresponding in its dimensions to the inside of the mold cavity. After this final foaming the molded and shaped article so obtained is cooled within the mold. It must be cooled until the inside of the molded body has dropped to temperatures below the softening point. When the molded article is prematurely removed from the mold, deformation may take place. Because foamed plastics are good insulators, relatively long cooling times are required to cool the molded articles. The time after which a molded article can be ejected at the earliest without thereby incurring subsequent deformation is termed the minimum dwell time (MDT).

After ejection, the molded article is stored for some further time until full cooling is achieved and, when a block for instance is involved, the block is then cut into foamed panels for insulating purposes. During the block storage its side faces collapse more or less, and this phenomenon is observed mostly at those sides which are directly exposed to steaming. The collapse of the blocks and a degraded fusion of the foamed styrene polymer particles especially takes place when a halogenated flame-retardant agent has been added to the styrene polymer. There have been numerous attempts made to optimize the processing parameters of minimum dwell time and fusion grade by providing additives of the most diverse sort. Thus it is recommended to add fatty acids or fatty acid derivatives as disclosed in U.S. Pat. No. 3,389,097 and West German Pat. No. 21 33 253, or rubber, as disclosed in U.S. Pat. No. 3,682,844 and West German Pat. No. 21 01 666. Further, polyethylene waxes are used as disclosed in U.S. Pat. Nos. 3,320,188 and 3,060,138 and European Pat. No. 0 000 120, or bromine compounds as disclosed in French Pat. No. 1 530 701 and West German published application No. 25 42 281 and these additives are recommended to shorten the minimum dwell time but with high degrees of fusion. Again suggested are process-technological steps such as quicker cooling of the beads prior to foaming as disclosed in German Pat. No. 15 04 577. West German published application No. 27 55 005 describes an improved process for preparing expandable styrene polymer particles, the operation being in a reactor completely filled with water. This process is costly in apparatus and the homogeneous mixing of a completely filled polymerizing reactor is not assured in practice. Caking cannot be prevented in such a system, especially where substantially large reactors are involved, and the caking results in a high proportion of unusable beads.

As mentioned above, a pronounced collapse of the sides of the final-foamed blocks is observed, especially for flame-proofed, expandable styrene polymers. To prevent this drawback, a variety of additives such as hydroxylamines as disclosed in U.S. Pat. No. 3,755,209, amines as disclosed in U.S. Pat. No. 4,029,614, or triazine derivatives substituted with amines as disclosed in U.S. Pat. No. 4,192,922 have been proposed. Supposedly, too, the addition of bromine compounds copolymerizing with styrene improves the dimensional stability of the foamed blocks as disclosed in U.S. Pat. No. 4,086,191. However, all the additives suffer from the drawback that they enter into unmanageable side-reactions with the other polymerization accessories such as initiators and thereby contribute to poor product reproducibility. Moreover, the additives used in many cases are physiologically objectionable, thereby restricting the product applicability.

SUMMARY OF THE INVENTION

Having in mind the limitations of the prior art, it is an object of the present invention to create a production process making it possible by simple process-technological steps and without special additives to overcome these limitations. The simplified process technology, at the same time, shall also provide improved product properties, i.e., the disadvantageous product properties do not take place.

It has been found according to the present invention that it is possible to make fine-particulate, expandable styrene polymers which in addition to excellent processing properties such as degree of fusion and good dimensional stability also evince a uniform cell structure by:

(a) polymerizing styrene and possibly styrene with conventional comonomers in an aqueous solution with stirring in the presence of monomer-soluble, radical-forming initiators and dispersants;

(b) adding liquid hydrocarbon expanding agents having 5 or more carbon atoms of low boiling points and at a monomer conversion of at least 70%, into an incompletely filled reactor;

(c) during the addition of the expanding agent the polymer beads to be charged are vigorously stirred in such a manner that they experience as little as possible contact in time and space with the gas phase and with each other; and (d) during the stirring of (c) the surface of the stirred medium is maintained as full as possible from a funnel shape.

BRIEF DESCRIPTION OF THE DRAWINGS

The invention is further disclosed in the drawings appended hereto, wherein.

DESCRIPTION OF THE PREFERRED EMBODIMENTS

Figure 1:
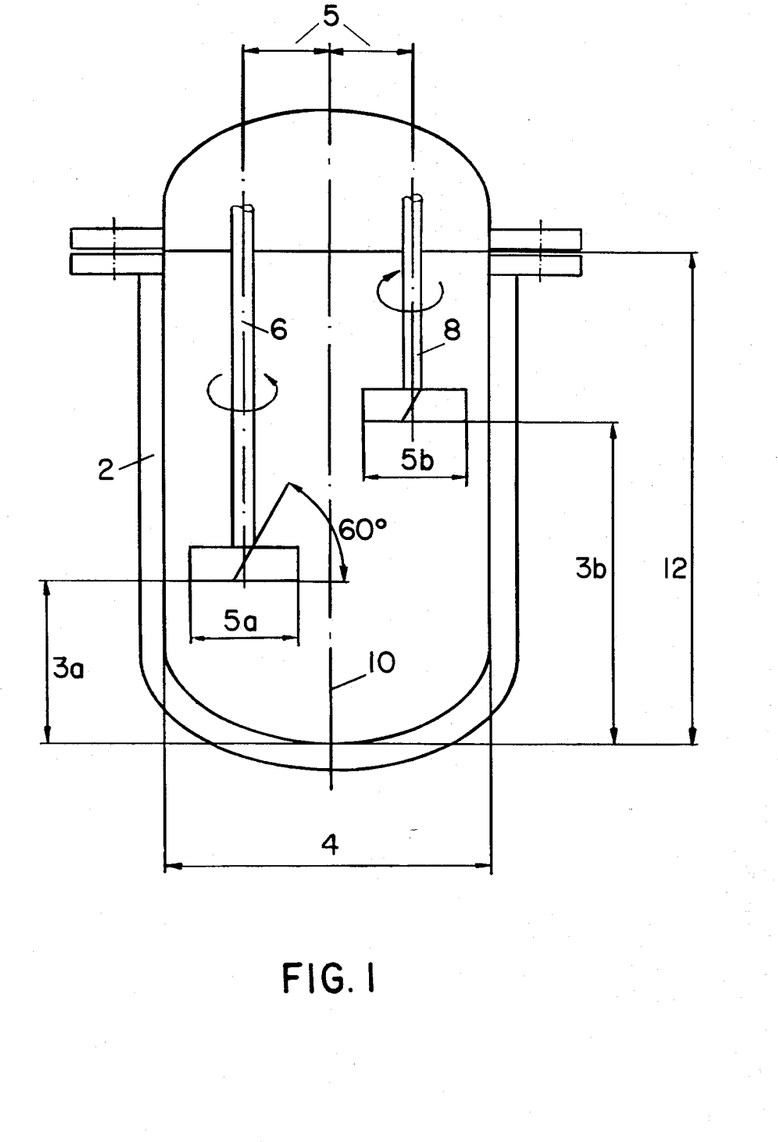
FIG. 1 is a schematic, elevational view in cross-section of a pressure resistant reactor of corrosion resistant steel having a dual axial turbulence (DAT) stirring system.

With particular reference to FIG. 1, the reactor 2 has an internal diameter 4 and stirrers 6 and 8 are positioned on opposite sides of the center line or axis of symmetry 10. The distance between the axes of 6 and 8 is 5 while the diameter of the stirrer of 6 is 5a and the diameter of the stirrer of 8 is 5b. The spacing between the lowest point on the bottom of the reactor and stirrer 6 is 3a and the spacing for stirrer 8 is 3b. The height of the filling is 12. As seen from the arrows, the stirrers rotate in opposite directions.

Figure 2:
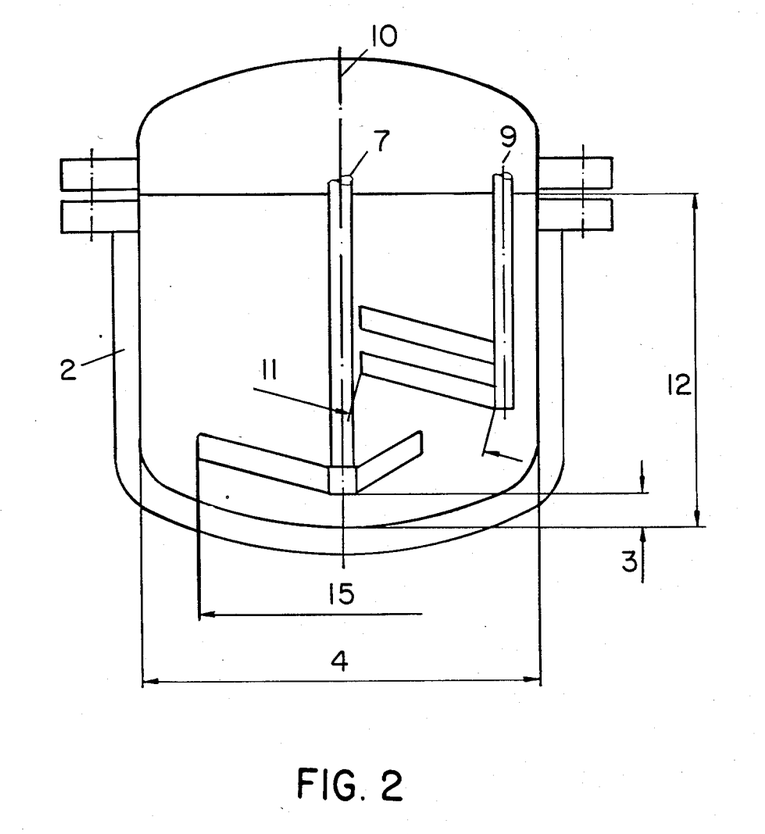
FIGS. 2 and 3 are schematic, elevational views in cross-section of pressure resistant reactors of corrosion resistant steel having a coaxial stirrer and a laterally offset and elevated flow impeding means.
Figure 3:
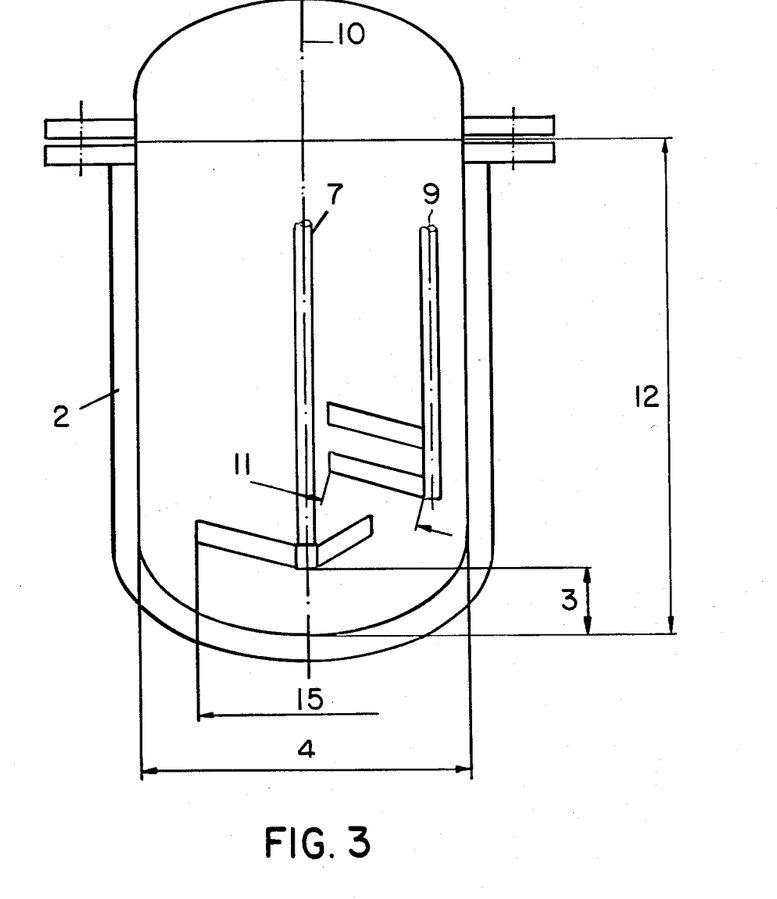
Figure 4:
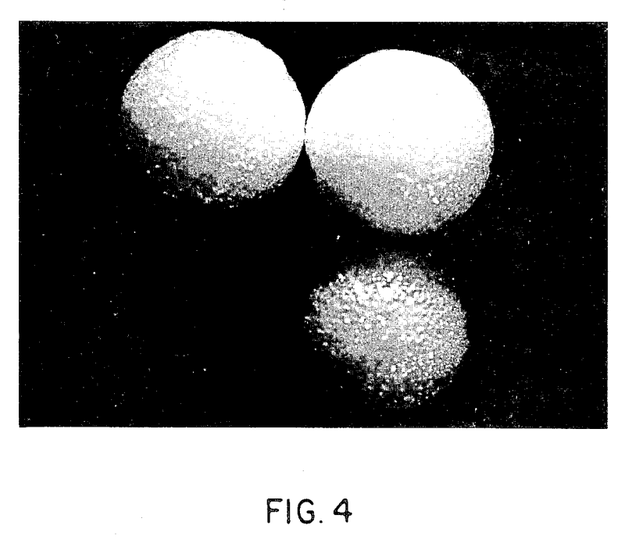
FIG. 4 is a microphotograph through an optical microscope of prefoamed beads made from the material in Example 1.
Figure 5:
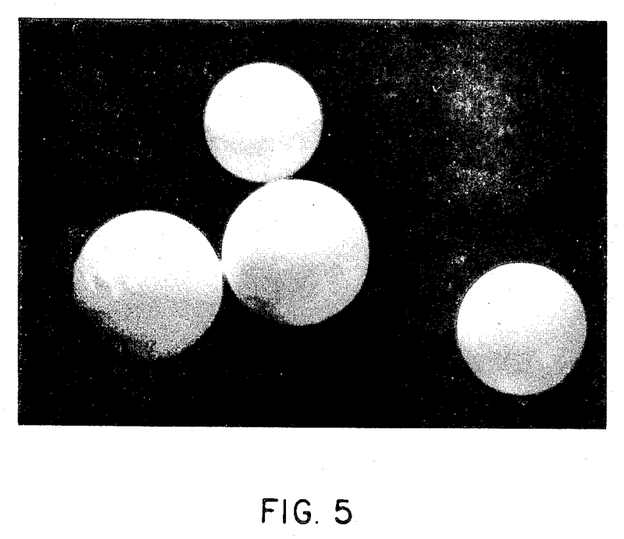
FIG. 5 is a microphotograph made through an optical microscope of prefoamed beads made from the material in comparison Example 13.
Figure 6A:
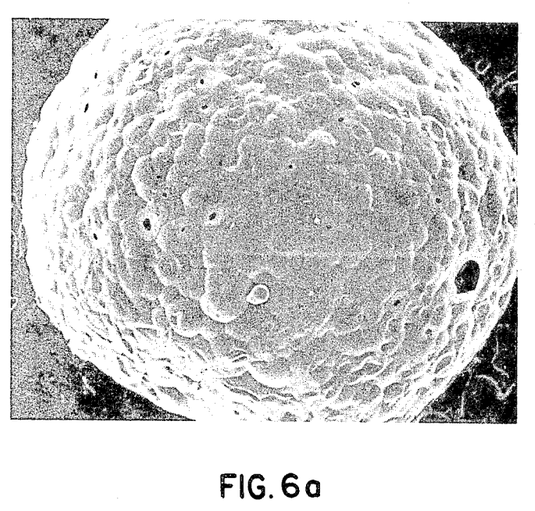
FIG. 6a is an electron scan microphotograph of the surface of the prefoamed bead of Example 1.
Figure 6B:
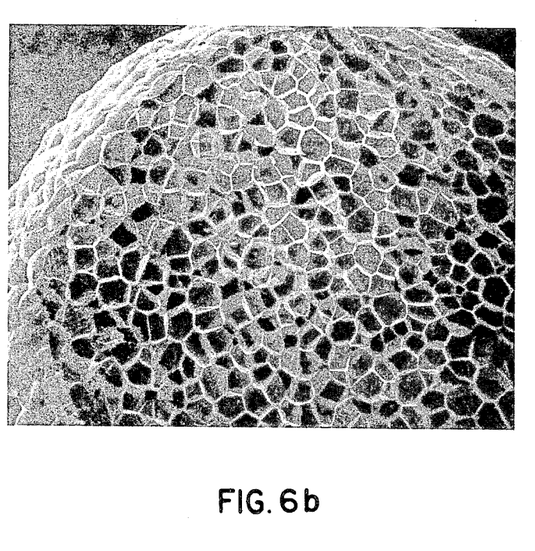
FIG. 6b is an electron scan microphotograph of the cross-section of the prefoamed bead of Example 1.
Figure 7A:
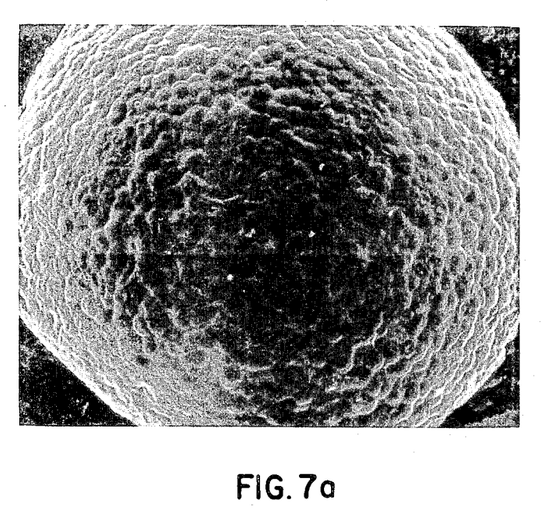
FIG. 7a is an electron scan microphotograph of the surface of the prefoamed bead of Example 2.
Figure 7B:
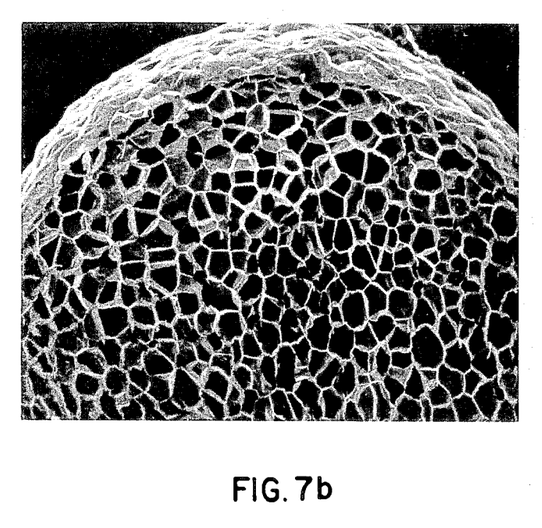
FIG. 7b is an electron scan microphotograph of the cross-section of the prefoamed bead of Example 2.
Figure 8:
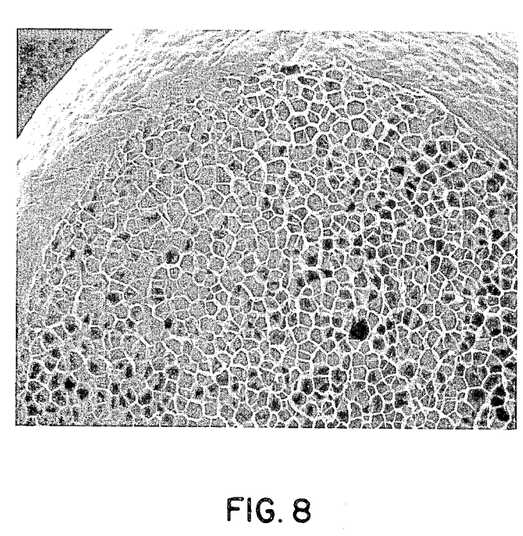
FIG. 8 is an electron scan microphotograph of the cross-section of the prefoamed bead of comparison Example 3.
Figure 9A:
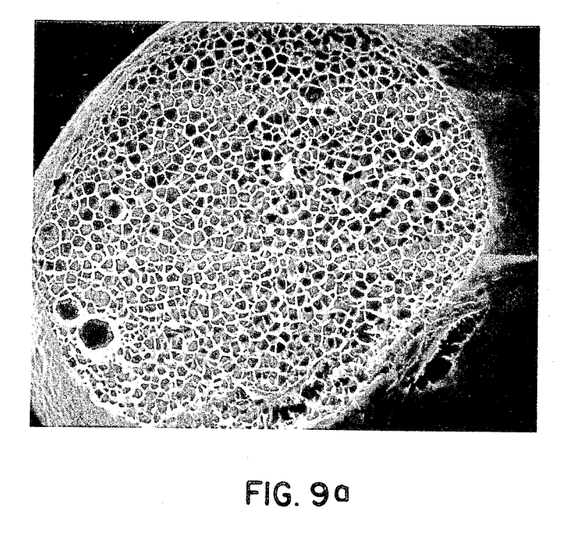
FIGS. 9a and 9b are electron scan microphotographs of the cross-section of the prefoamed beads of comparison Example 13.
Figure 9B:
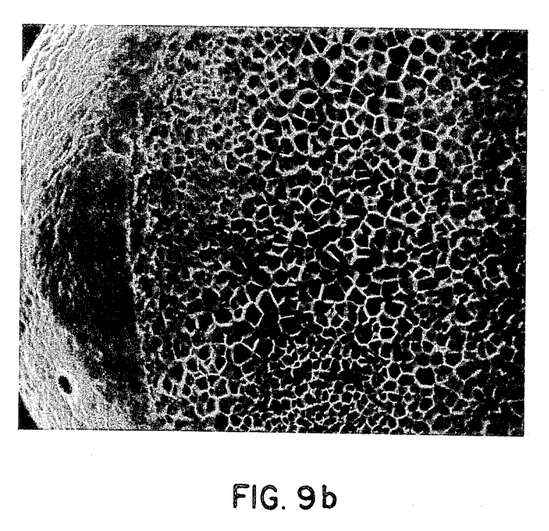

In FIGS. 2 and 3 the reactor is 2, the stirrer is 7 and the flow impeding means is 9. The spacing between stirrer 7 and the lowest point of the reactor is 3 while the internal diameter of the reactor is 4, the diameter of the flow impeding means is 11 and the zone put into motion is 15. Stirrer 7 is concentric with axis 10 and the filling level is 12.

U.S. Pat. No. 3,265,643 discloses a method for the production of foamable polystyrene particles by suspension-polymerizing with stirring in the presence of a water-soluble nitrite, this nitrite being added before a polymerization conversion of 98% has been reached. Solely gaseous expanding agents, namely propane or butane, are used, and these are added after a styrene conversion of 80 to 98% has been reached. U.S. Pat. No. 3,265,643 further discloses that there is a direct relationship between the shape of the polystyrene particles and the final product made from them, that is, the polystyrene particles should assume an approximately spherical shape (loc. cit. column 3, lines 28 through 44). Supposedly, this is achieved by a suitable selection of the dispersant and of the stirring conditions during polymerization, no eddy effects being allowed in the liquid phase so that particle collisions are avoided and defects at the particle surfaces consequently are eliminated (loc. cit., column 9, lines 42 through 47).

U.S. Pat. No. 3,265,643 does not recognize that the conditions of stirring during the addition of the expanding agent are decisive other than to produce the most spherical possible shape of the polystyrene particles.

Accordingly the process of the present invention demands that no excessive shear gradients occur in the polymerization reactor during the addition of the expanding agent, in other words a balance of horizontal and vertical mixing effects with turbulent flow shall prevail.

Therefore the least contact between the particles and the gas phase and each other during the addition of the expanding agent is determined by the stirring conditions. An essential condition is that when stirring, the surface of the stirred medium remain as free as possible from any funnel shape, in other words, funnel-formation will be avoided when that surface of the liquid phase which is facing the gas phase is motionless.

The adjustment of the angular speed and of the height of filling to the reactor geometry for the purpose of maintaining the required conditions can be implemented by conventional means. Therefore both during the polymerization and during the addition of the expanding agent, the same angular speeds can be used, though in general they will be different, the essential point being that the cited essential conditions, the surface being practically free of a funnel-shape, be observed during the addition of the expanding agent. If the height of the filled reactor is ½ to less than 1½ the reactor diameter, only one stirrer parallel to the axis of symmetry and a corresponding flow-interfering means are used.

All systems are suitable for stirring the reactor contents that cause a pronounced axial rotation of the polymer particles with respect to the rotational translation. Mixing systems with a stirrer parallel to the axis or coaxial with it have been found useful, where the stirrer cooperates with one or more flow-interfering means of the most diverse shapes and size which are arranged laterally offset from the vessel axis. The stirrer for instance may be an impeller, of which the angular speed can be fitted to the shape and the number of the flow-interfering means.

As regards reactors for which the filled height is at least 1½ to 3 times the reactor diameter, a stirring system is used which consists of at least two stirrers rotating in opposite directions and which are mounted asymmetrically. Such stirring systems are known as dualaxial turbulence systems. They permit homogeneously mixing in very slender reactors without funnel formation. This especially advantageous design is particularly suitable for large reactors exceeding a content of 50 cubic meters, and especially 100 cubic meters. The slender shape is especially required for these large reactors in order to quickly enough remove the heat of polymerization.

It has been especially advantageous to meter the expanding agent into the liquid phase. The addition of the expanding agent takes place at a minimum monomer conversion of about 70%, especially from 70 to 85%.

The polymers made by the process of the present invention are characterized in that they expand during the prefoaming stage into prefoamed beads with an exceedingly homogeneous cell structure, these prefoamed beads evincing a surface structure like raspberries. Electron microphotographs show that these bubbles at the surface of the prefoamed bead are the last outward cells and that these external cells are about the same size as the inside cells of the prefoamed bead as shown in FIGS. 4 through 9.

Styrene as the monomer, or comonomer mixtures with at least 50% by weight of styrene are used to produce the fine-particulate expandable styrene polymers. Suitable comonomers for instance are alpha-methylstyrene, nuclear-halogenated styrenes, acrylonitrile, esters of the acrylic and methacrylic acid with alcohols having 1 to 8 C atoms, N-vinyl compounds such as N-vinylcarbazole, and also slight amounts of butadiene or divinylbenzene.

The suspension polymerization is appropriately carried out at temperatures between 80° and 130° C. by the bead prepolymerization method as disclosed in U.S. Pat. No. 4,228,244. It is initiated in conventional manner using one or more radical-forming substances, such as t-butylperbenzoate, t-butylperoctoate, di-t-butylperoxide, dibenzoylperoxide or their mixtures.

The suspension stabilizers used are for example organic protective colloids such as polyvinyl alcohol, polyvinyl pyrrolidone or polyvinyl pyrrolidone copolymers or mineral suspension agents such as finely distributed tricalcium phosphate or barium phosphate, or also mixtures of organic protective colloids and mineral suspension agents.

The expanding agents used are the known liquid, aliphatic, low boiling-point, strictly swelling hydrocarbons having 5 or more carbon atoms such as pentane, hexane, cycloaliphatic hydrocarbons such as cyclohexane or also mixtures of these compounds. The proportion of expanding agent is between 3 and 15% by weight, preferably between 5 and 8% by weight referred to the styrene polymer.

The expandable styrene polymers can contain the conventional flame-retardant means such as halogen compounds, in particular bromine compounds such as the completely or partly brominated oligomers of butadiene or of isoprene with an average degree of polymerization of 2 to 20, for example 1,2,5,6-tetrabromocyclooctane, 1,2,5,6,9,10-hexabromocyclododecane, brominated polybutadiene with a degree of polymerization of for instance 3 to 15.

The organic halogen compounds are present in proportions of 0.4 to 3% by weight in the expandable styrene polymer. The known synergists can be used in a conventional manner in addition to the flame-retardant halogen compounds, preferably organic peroxides, especially those with a half life of at least two hours at 373° K.

When desired the halogen compounds can also be used in proportions of 0.05 to 1% by weight to improve the minimum dwell time. However such an additive is not required in the process of the present invention.

Moreover the expandable styrene polymers may contain additives such as dyes, fillers and stabilizers. After preparation they are in the form of fine particulates (for instance beads) and as a rule are from 0.4 to 3 mm in diameter. They are foamed further in the prefoamed state by the prefoaming method and by being heated in molds which seal but not in a gas-tight manner, and are thus sintered into foamed bodies corresponding in their external dimensions to the inside cavities of the molds used. The styrene polymers can be processed into outstanding dimensionally stable molded articles. Foamed blocks 1×1×½ m in size following ejection evince only minute collapse at their side faces. The foamed bodies or blocks are further characterized by a good fusion between the individual particles. Accordingly they offer good mechanical strength.

The process of the present invention offers another advantage in that the processing properties of minimum dwell time and fusion grade can be adjusted at will. The prefoamed articles obtained by the process of the present invention surprisingly present a clearly raspberry-like structure. As shown by the attached FIGS. 4 through 9 of optical and electron microscope photographs, the bubbles at the surface of the prefoamed beads are the last cells on the outside, that is, the cell structure is extremely uniform. In this manner an enlargement in the surface of the prefoamed beads is achieved, whereby the fusion between the pre-foamed beads is improved during final foaming. In this manner substantially less energy is required to achieve the same degree of fusion, that is, the foamed blocks are final-foamed at a lesser steaming pressure.

EXAMPLES 1 THROUGH 7

In every case a mixture of 100 parts by weight of fully desalted water, 100 parts by weight of styrene, 0.4 parts by weight of dibenzoyl peroxide, 0.1 part by weight of tert.-butylperbenzoate, 0.75 parts by weight of hexabromocyclododecane, 0.30 parts by weight of dicumyl peroxide were heated with stirring in a pressure-resistant vessel of corrosion-resistant steel, as shown in FIG. 2, to a temperature of 90° C. The angular speed of the stirrer was set at the values listed in Table 1. After 3 hours at 90° C., 0.1 part by weight (referred to the aqueous phase) of polyvinyl alcohol with a saponification number of 140 was added. Directly thereafter 7 parts by weight of a mixture of 25% by weight of iso- and of 75% by weight of n-pentane was added within 10 to 15 minutes, and immediately before the addition of the expanding agent at a monomer conversion of about 75%, the change in the angular speed of the stirrer was implemented. After another hour at 90° C., the preparation was heated to 120 and kept for 6 hours at this temperature.

The substance was cooled upon the completion of the polymerization cycle, and the bead polymer so obtained was separated from the aqueous phase, dried and sifted. The finished product was surface-coated as disclosed in U.S. Pat. No. 3,789,028.

The bead fraction between 1 and 2 mm diameter was prefoamed in a continuous prefoamer of the Rauscher type, in flowing steam, down to a bulk weight of 15 grams per liter, then it was stored for 24 hours and next it was final-foamed at various steam pressures into foamed blocks 100×50×100 cm. Each example was repeated at least 5 times. The standard deviations are listed next to the test values. The test values are listed together in Table 1.

The examples listed in Table 1 show that products without further additives already offering foamed blocks of a high degree of fusion and little block shrinkage at an adequately short cooling time can be made only when observing the process conditions of the present invention. The possibility of controlling the processing properties by means of the angular stirrer speed when adding the expanding agent is particularly impressive. Table 1 clearly shows that the stirring conditions during the addition of the expanding agent are essential, not the stirring beforehand, that is, during the polymerization proper.

FIG. 2 shows a reactor for which the height of filling (12) is less than 1½ times the reactor diameter (4).

The test results of Table 1 were obtained from 150 liter vessels characterized as follows (in mm):

FIG. 2

| Dimension | mm |
| --- | --- |
| (4) Diameter | 600 |
| (12) Filling Height | 500 |

FIG. 2-continued

| Dimension | mm |
| --- | --- |
| (3) Spacing | 50 |
| (11) Diameter | 225 |
| (15) Zone Diameter | 440 |

These dimensional relations can be adapted in conventional manner to larger reactors.

TABLE 1

| Example # | Reactor | Stirrer Angular speed (rpm) Addition of Expanding Agent Before | Stirrer Angular speed (rpm) Addition of Expanding Agent During | Stirred Funnel | Prefoaming Bubble Size mm[7] | MDT[1] min | Degree of Fusion %[2] | Block Shrinkage %[3] | Cell's Cellularity mm[4] |
| --- | --- | --- | --- | --- | --- | --- | --- | --- | --- |
| 1 | FIG. 2 | 200 | 120 | None | 0.2 | 25 ± 2 | 90 ± 10 | <0.2 | 4–6 |
| 2 | FIG. 2 | 200 | 150 | Slight | 0.1 | 15 ± 2 | 70 ± 10 | 0.6 ± 0.2 | 4–6 |
| 3 | FIG. 2 | 200 | 200 | Strong | <0.05 | 10 ± 2 | 30 ± 10 | 1.5 ± 0.4 | 2–10 |
| 4 | FIG. 2 | 120 | 120 | None | 0.2 | 25 ± 2 | 90 ± 10 | <0.2 | 4–6 |
| 5 | FIG. 2 | 120 | 150 | Light | 0.1 | 15 ± 2 | 70 ± 10 | 0.6 ± 0.2 | 4–6 |
| 6 | FIG. 2 | 120 | 200 | Strong | <0.05 | 10 ± 2 | 30 ± 10 | 1.5 ± 0.4 | 2–10 |
| 7 | FIG. 2 | 150 | 150 | Light | 0.1 | 15 ± 2 | 70 ± 10 | 0.6 ± 0.2 | 4–6 |

Examples 1, 2, 4, 5 and 7 are according to the invention, examples 3 and 6 are comparisons, examples 2, 5 and 7 represent the tolerance limit regarding the surface nature of the beads. It is shown that still better results are obtained when the stirring funnel is reduced further.

TABLE 2

| Effect of steaming conditions | | | | |
| --- | --- | --- | --- | --- |
| Example # | Steaming Time Seconds[5] | Steam Pressure[6] | Degree of Fusion %[2] | Block Shrinkage %[3] |
| 1, 4 | 0 | 1.9 | 100 | <0.2 |
|  | 20 | 1.8 | 90 ± 10 | <0.2 |
|  | 50 | 1.5 | 90 ± 10 | <0.2 |
|  | 20 | 1.5 | 90 ± 10 | <0.2 |
| 2, 5, 7 | 20 | 1.8 | 60 ± 10 | 0.6 ± 0.2 |
|  | 50 | 1.5 | 70 ± 10 | 0.6 ± 0.2 |
|  | 20 | 1.5 | 70 ± 10 | 0.6 ± 0.2 |
| 3, 6 | 20 | 1.8 | 30 ± 10 | 1.5 ± 0.4 |
|  | 50 | 1.5 | 20 ± 10 | 1.5 ± 0.4 |

EXAMPLES 8 THROUGH 12

The same composition was placed in the reactors shown in FIGS. 1 and 3 as in the Examples 1 through 7. A stirring system was integrated into the reactor of the FIG. 1, which is known by the name of dual axial turbulence (DAT) system. Even when the reactor is 90%-filled, the two stirrers make homogeneously mixing where the contents are without a stirring funnel. The reactor of FIG. 3 used the stirring system of FIG. 2. The results are listed in Table 2 and agree with those obtained from the reactor of FIG. 2.

The results listed in Table 2 show that the DAT stirring system offers a better product when the surface of the liquid facing the gas space is motionless and such a motion cannot be adequately obtained from the reactor type shown in FIG. 3.

FIGS. 1 and 3 show a reactor wherein the filled height is at least 1½ times the reactor diameter (4). In FIG. 1 the references (3a) and (3b) again designate the spacing between the stirrers and the lowest point in the vessel bottom. The distance between the stirrer axis and the axis of symmetry of the vessel is designated by (5) and the diameter of the stirrers by (5a) and (5b). In FIG. 3 the stirrer is denoted by (7), the flow-impeding means by (9), the spacing between the stirrer and the lowest point of the vessel bottom by (3), the diameter of the flow-impeding means by (11) and the diameter of the zone put into motion by (15).

The test results of Table 3 are analoguously obtained in a vessel of 150 liters, where the following values apply:

| FIG. 1 | | FIG. 2 | |
|---|---|---|---|
| Dimension | mm | Dimension | mm |
| (4) | 500 | (4) | 500 |
| (12) | 750 | (12) | 750 |
| (3a) | 247 | (3) | 100 |
| (3b) | 487 | | |
| | | (4) | 160 |
| (5) | 125 | (15) | 350 |
| (5a) | | | |
| (5b) | 167 | | |

The dimensional relations can be adapted in conventional manner to larger reactors.

TABLE 3

| Example # | Reactor | Angular Stirrer Speed in RPM Addition of Expanding Agent Before | During | Stirring Funnel | Prefoamed Bubble Size mm[7] | MDT min[1] | Degree of Fusion %[2] | Block Shrinkage %[3] | Cell's Cellularity mm[4] | Remarks |
|---|---|---|---|---|---|---|---|---|---|---|
| 8 | FIG. 1 | 250 | 200 | | 0.2 | 25 ± 2 | 90 ± 10 | <0.2 | 4–6 | Liquid phase surface is motionless |
| 9 | FIG. 1 | 250 | 250 | | 0.1 | 15 ± 2 | 70 ± 10 | 0.6 ± 0.2 | 4–6 | Slight motion |
| 10 | FIG. 1 | 250 | 300 | | <0.05 | 10 ± 2 | 40 ± 10 | 1.5 ± 0.4 | 2–10 | Surface restless bubbles |
| 11 | FIG. 3 | 250 | 150 | Light | <0.05 | 10 ± 2 | 30 ± 10 | 1.5 ± 0.4 | 2–10 | |
| 12 | FIG. 3 | 250 | 200 | Strong | — | 10 ± 5 | 20 ± 10 | 3.8 ± 1.0 | 1–20 | |
| 13 | FIG. 3 | 250 | 250 | Strong | — | 10 ± 5 | 20 ± 10 | 3.8 ± 1.0 | 1–20 | |

Example 8 is according to the invention, Examples 10 through 13 are controls, Example 9 again shows the possible limit to tolerances.
[1]Minimum dwell time in mold
[2]The degree of fusion is the ratio of the number of torn beads to the total number of particles × 100 (= %). The test object is foamed panel 100 × 100 × 50 cm.
[3]The block shrinkage is the collapse of the side surfaces as measured 24 hours after manufacturing the block. The block shrinkage is determined by measuring the block thickness (density) from the center of a large side to the opposite and orthogonally thereto. The difference between the inside mold size at this location and the block thickness at this location when expressed in % of this inside mold dimension is the block shrinkage.
[4]Panels were taken from 10 different places in the block to determine microscopically the cell density (number), and the cells were counted, this for every test. The values listed are always the highest and lowest cell numbers found. The closer the values to each other, the more homogeneous is the block's cell structure.
[5]The steaming time is the time from reaching the stated steam pressure in the block mold to the closure of the steam supply valve.
[6]Steam pressure in the block mold.
[7]The bubble size of the prefoamed beads is the average diameter of the outward cells of the prefoam. This is ascertained by measurements on the prefoam pictures taken by the electron scan microscope, an average being taken in each case from 50 measurements (FIGS. 4 through 8).

We claim:
1. A process for the production of fine particulate, expandable styrene polymers of uniform cell structure in a reactor having a given diameter and a vertical axis of symmetry, consisting essentially of the following sequential steps:
   (a) filling said reactor to a height of from 0.5 to less than 1.5 times said reactor diameter with styrene or a mixture thereof with at least one monomer copolymerizable therewith in an aqueous suspension in the presence of monomer-soluble, radical-forming initiators and dispersing agents and producing a top surface of said aqueous suspension in contact with a gas phase;
   (b) stirring said aqueous suspension with a stirrer parallel to said axis of symmetry and flow impeding means parallel to said stirrer;
   (c) polymerizing said styrene or mixture thereof to a monomer conversion of 70 to 85% of polymer beads with said stirring;
   (d) adding 3 to 15% by weight of liquid hydrocarbon expanding agents having 5 or more carbon atoms based on the weight of said styrene or mixture thereof;
   (e) vigorously stirring said polymer beads being charged with and during addition of said expanding agents with the least possible contact in time and space of said polymer beads and with said gas phase and producing a balance of horizontal and vertical mixing with turbulent flow, said top surface of the stirred aqueous suspension having substantially a topology free of a funnel shape; and
   (f) completing the polymerization cycle.

2. A process for the production of fine particulate, expandable styrene polymers of uniform cell structure in a reactor having a given diameter and a vertical axis of symmetry, consisting essentially of the following sequential steps:
   (a) filling said reactor to a height of from at least 1.5 to 3.0 times said reactor diameter with styrene or a mixture thereof with at least one monomer copolymerizable therewith in an aqueous suspension in the presence of monomersoluble, radical-forming initiators and dispersing agents and producing a top surface of said aqueous suspension in contact with a gas phase;
   (b) stirring said aqueous suspension with two stirrers rotating in opposite directions and arranged parallel to but asymmetrically to said axis of symmetry;
   (c) polymerizing said styrene or mixture thereof to a monomer conversion of 70 to 85% of polymer beads with said stirring;
   (d) adding 3 to 15% by weight of liquid hydrocarbon expanding agents having 5 or more carbon atoms based on the weight of said styrene or mixture thereof;
   (e) vigorously stirring said polymer beads being charged with and during addition of said expanding agents with the least possible contact in time and space of said polymer beads with said gas phase and producing a balance of horizontal and vertical mixing with turbulent flow, said top surface of the stirred aqueous suspension having substantially a topology free of a funnel shape; and (f) completing the polymerization cycle.

3. The process of claim 1, wherein said expanding agent is metered into a liquid phase of said polymer beads.

4. The process of claim 2, wherein said expanding agent is metered into a liquid phase of said polymer beads.

5. The process of claim 1, wherein said reactor has a volume of at least 50 cubic meters.

6. The process of claim 2, wherein said reactor has a volume of at least 50 cubic meters.

7. The process of claim 1, wherein said polymer beads are from 0.4 to 3 mm in diameter.

8. The process of claim 2, wherein said polymer beads are from 0.4 to 3 mm in diameter.

9. The process of claim 1, wherein the proportion of expanding agent is 5 to 8%.

10. The process of claim 2, wherein the proportion of expanding agent is 5 to 8%.

11. The process of claim 1, wherein said stirrer is coaxial with said axis of symmetry.

* * * * *